United States Patent [19]
Lee

[11] Patent Number: 5,461,688
[45] Date of Patent: Oct. 24, 1995

[54] FIBER OPTIC CONNECTOR WITH ELECTRICAL CONTACT

[75] Inventor: Hsin Lee, Issaquah, Wash.

[73] Assignee: Augat Inc., Mansfield, Mass.

[21] Appl. No.: 300,322

[22] Filed: Sep. 2, 1994

[51] Int. Cl.[6] .................................................. G02B 6/38
[52] U.S. Cl. ............................................................ 385/75
[58] Field of Search .................................. 385/72, 75, 87, 385/101

[56] References Cited

U.S. PATENT DOCUMENTS

| | | | |
|---|---|---|---|
| 3,792,284 | 2/1974 | Kaelin | 250/551 |
| 4,279,469 | 7/1981 | Forman | 350/96.22 |
| 4,373,777 | 2/1983 | Borsuk et al. | 350/96.20 |
| 4,427,879 | 1/1984 | Becher et al. | 250/215 |
| 4,449,784 | 5/1984 | Basov et al. | 350/96.21 |
| 4,545,645 | 10/1985 | Migien | 350/96.21 |
| 4,666,242 | 5/1987 | Cairns | 385/75 |
| 4,678,264 | 7/1987 | Bowen et al. | 350/96.20 |
| 4,699,455 | 10/1987 | Erbe et al. | 350/96.20 |
| 4,717,232 | 1/1988 | Priaroggia | 350/96.20 |
| 4,767,168 | 8/1988 | Grandy | 350/96.2 |
| 4,767,181 | 8/1988 | McEowen | 385/75 |
| 4,896,939 | 1/1990 | O'Brien | 350/96.23 |
| 4,969,924 | 11/1990 | Suverison et al. | 350/96.20 |
| 4,993,803 | 2/1991 | Suverison et al. | 350/96.20 |
| 5,140,659 | 8/1992 | Minds et al. | 385/66 |
| 5,159,651 | 10/1992 | Gandy | 385/75 |
| 5,188,539 | 2/1993 | Langdon | 439/341 |

Primary Examiner—Rodney B. Bovernick
Assistant Examiner—Robert E. Wise
Attorney, Agent, or Firm—Weingarten, Schurgin, Gagnebin & Hayes

[57] ABSTRACT

A fiber optic connector includes an electrical contact for connection with an electrical wire formed within a fiber optic cable. The connector includes a connector body, at least a portion of which is electrically conducting, and an optical fiber retaining body coupled to the connector body. The electrical wire from the cable is coupled to the electrically conducting connector body of the connector. An adapter assembly for coupling the fiber optic connector to any suitable device also includes an electrical conductor for coupling to an electrical application. An electrical contact mounted to the adapter assembly provides an electrically conducting current path between the connector body and the conductor on the adapter assembly.

10 Claims, 2 Drawing Sheets

5,461,688

FIBER OPTIC CONNECTOR WITH ELECTRICAL CONTACT

FIELD OF THE INVENTION

This invention relates to connectors and more particularly to fiber optic and electrical wire connectors.

BACKGROUND OF THE INVENTION

Certain applications utilize both optical fiber cables and electrical wires. One such application arises in telephone digital system cross-connect (DSX) networks, in which a multitude of digital transmission paths which utilize optical fiber cables are interconnected. Larger DSX networks are distributed among a number of equipment bays located in a central facility. Tracing or troubleshooting two interconnected transmission paths among the numerous equipment bays may entail insertion of a test lead into a monitoring jack on one equipment bay. Insertion of the test lead causes tracer lamps on both equipment bays to illuminate, to identify the interconnected transmission paths. The tracer lamps on the equipment bays are typically LEDs, to which an electrical wire is connected. However, optical fiber cables are used for the connection to the transmission paths. Accordingly, the test leads must incorporate both optical fibers and electrical wires.

The electrical wire and optical fiber may be formed within the same cable. However, the connector assembly at the cable's end for connection to the monitoring jack typically utilizes separate housings or subhousings for the electrical wire and the optical fiber, wherein the electrical wire must be branched off separately from the optical fiber. Such connector assemblies are bulky and waste a considerable amount of space.

SUMMARY OF THE INVENTION

The present invention provides a SC fiber optic connector having an electrical contact implanted within the connector. The fiber optic connector of the invention is compact and allows connection of the optical fiber and electrical wire within a single connection housing.

The fiber optic connector includes an optical fiber connector assembly having a connector body and an optical fiber retaining body disposed within the connector body. The connector body, or a portion thereof, is electrically conducting. An electrical wire in the fiber optic cable is connected to the electrically conducting connector body by a crimping element.

An adapter assembly connects the fiber optic connector, with the fiber optic cable retained therein, to the desired fiber optic application. The adapter assembly further includes an electrical contact which is in electrical communication with the electrically conducting connector body. The contact is in turn in electrical communication with a conductor mounted on the adapter. In this manner, an electrically conducting current path is provided from the electrical wire through the connector body and the contact to the conductor on the adapter assembly. The conductor may be connected in any suitable manner to the desired electrical application.

DESCRIPTION OF THE DRAWINGS

The invention will be more fully understood from the following detailed description taken in conjunction with the accompanying drawings in which.

DETAILED DESCRIPTION OF THE INVENTION

Figure 1:
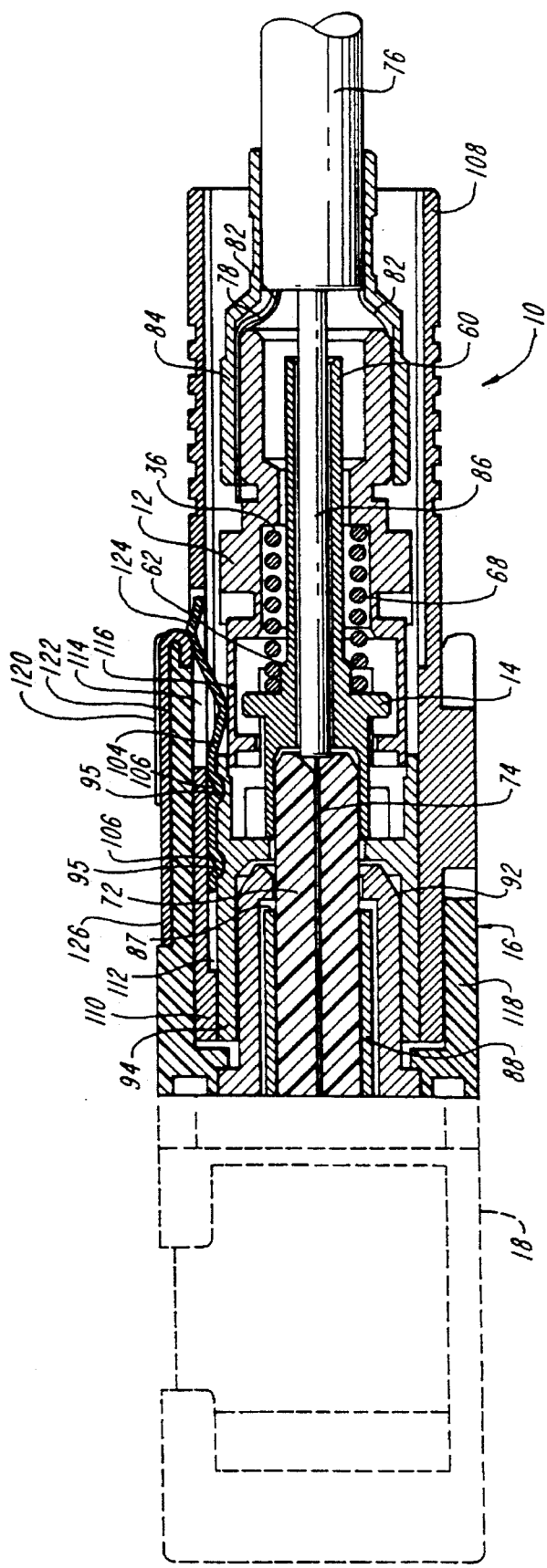
FIG. 1 is a cross-sectional view of an embodiment of a fiber optic connector according to the present invention.

As shown in FIG. 1, a fiber optic connector with electrical contact according to the present invention includes an optical fiber connector assembly 10 having a connector body, shown here as a back body 12, and an optical fiber retaining body, shown here as a front body 14 disposed in the back body 12. An adapter assembly 16, shown partially in cross-section and partially in side view 18, is provided to couple the connector to any suitable device and provide an electrically conducting current path for the electrical wire.

Figure 2:
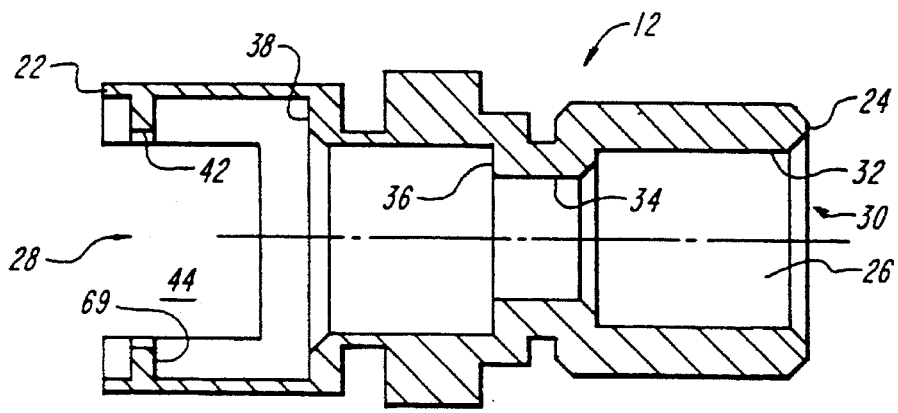
FIG. 2 is a cross-sectional view of the embodiment of the back body shown in FIG. 1.

Referring to FIG. 2 regarding the specific embodiment shown, the back body 12 includes front and back ends 22, 24 and a bore 26 extending between front and back openings 28, 30 at the respective front and back ends. An inner surface 32 of the back body 12 includes a neck down region 34 which defines a spring retaining region 35 defined at one end by a first shoulder 36. The back body 12 further includes a second shoulder 38 and a back body locking member 42 extending from the back body inner surface 32 into an open region 44 of the back body 12 thereby defining a catch area 45. As discussed further below, the back body 12, or a portion thereof, is made of a material which conducts electricity.

Figure 3:
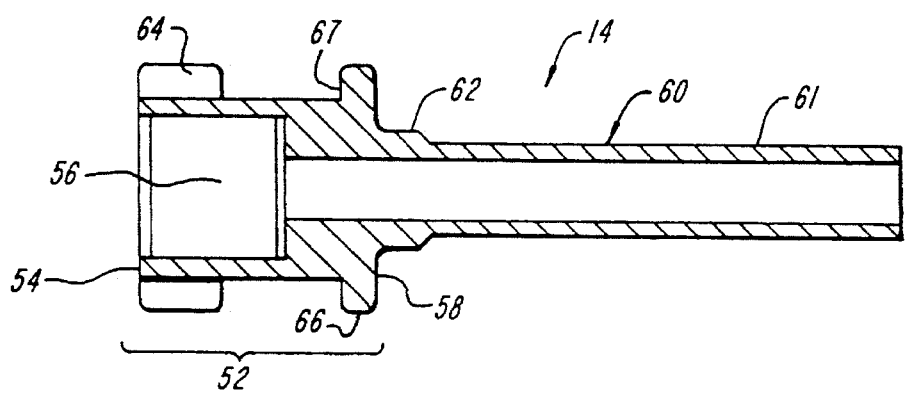
FIG. 3 is a cross-sectional view of an embodiment of the front body shown in FIG. 1.
Figure 4:
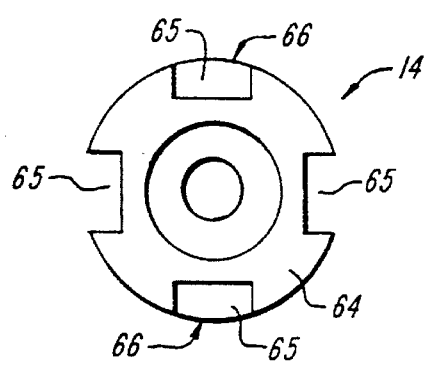
FIG. 4 is an end view of the embodiment of the front body shown in FIG. 3.

As shown in FIGS. 3 and 4, the front body 14 includes a base portion 52 having a first end 54, having a cavity 56 therein, and a second end 58. A buffer back post 60 projects from the second end 58 of the back body base portion 52. The front body 14 includes a step region 62 disposed on the second end 58 of the base portion 52. A flange 64, here provided as a ring-shaped member having slots 65 therein, projects from an outer surface of the front body 14. A front body locking member 66 projects from an outer surface of the front body 14.

In the assembled connector, a portion of the front body 14 is disposed in the bore 26 of the back body 12 and retained therein by cooperative engagement between the front body locking member 66 and the back body locking member 42, described more fully below. Although the back body 12 and the front body 14 each are here shown as an integral piece, the back 12 and front 14 bodies may be manufactured from one or more pieces and assembled together to provide the back 12 and front bodies 14 as single pieces, if desired.

Referring again to FIG. 1, a spring 68, having a outer diameter sized to fit within the spring retaining region 35 of the back body 12, surrounds the buffer back post 60. The spring 68 may be coupled to the front body 14 in any suitable manner, such as by an interference fit with the step region 62 of the buffer back post 60. In this manner, the spring 68 and the buffer back post 60 are concentrically aligned and spaced apart.

In the assembled configuration, a ferrule 72 is inserted into the cavity 56 of the front body 14 to thus couple the ferrule 72 to the buffer back post 60 through the front body 14. The second end 58 of the front body 14 is then inserted into the catch area 45 of the back body 12 such that the back body 12 is disposed over a portion of the front body and surrounds the buffer back post 60. When the front body 14 is inserted into the back body 12, a first end of the spring 68 contacts the first shoulder 36 of the back body 12. In this manner, only a limited contact area exists between the spring 68 and the back body 12 and between the spring 68 and the buffer back post 60, and the buffer back post 60 is self centering.

The buffer back post 60 and the spring 68 are spaced apart by a predetermined distance to provide an air gap spacing therebetween, allowing the buffer back post 60 to travel freely or "float" inside the spring 68. A free floating connector is desirable to avoid interference between the ferrule 72 and the back body 12 and to allow easy alignment of the ferrule 72 and an optical fiber. It should also be noted that even in the neck down region 34, a gap should be provided between the internal surface 32 of the back body 12 and an external surface 61 of the buffer back post 60.

When the front body 14 is inserted into the back body 12, the spring 68 compresses between the back body first shoulder 36 and the front body step region 62 and second end 58. Thus clearance is provided between the respective locking members 42 and 66. The front body 14 is then engaged with the back body 12 by rotating either the back body 12 or the front body 14 a sufficient angular distance to engage a first surface 67 of the locking member 66 of the front body 14 with a first surface 69 of the corresponding back body locking member 42. The distance between a second end 58 of the front body locking member 66 on which the spring 68 rests and the back body first shoulder 36 is selected such that the spring 68 is compressed and the front body 14 is secured to the back body 12 by the front body and back body locking members 66 and 42 respectively.

When engaging the front body locking member 66 and the back body locking member 42, the front body 14 is inserted into the bore 26 of the back body 12 a predetermined distance so that the locking members 66 and 42 may be properly oriented. The relative positions of the front and back body locking members 66 and 42 respectively are aligned such that when the front body 14 is released and the compressed spring 68 pushes against the front body 14, the front body and back body locking members 66 and 42 respectively abut and the spring 68 maintains a force between the front 66 and back body locking members 42 urging them together.

In the embodiment shown, the front body locking member 66 is provided as two wing-shaped members projecting from the outer surface of the front body 14, and the back body locking member 42 is provided as a slotted internal annular projection extending into the open region 44 of the back body 12. However, other locking members or locking arrangements may also be used. For example, the front body locking member 66 could be provided as any desired number of wings or catches, and a corresponding number of slots could be provided in the back body 12 to accept each of the catches. Alternatively, the back body locking member 42 and the front body locking member 66 may each be provided as a continuous ring having a diameter such that the front body locking member 66 may be press fitted through the aperture provided by the back body locking member 42. In yet another embodiment, the back body locking member and the front body locking member 42 may be cooperatively threaded such that the front body 14 could be entirely threaded through the back body locking member 42; after threading the front body locking member 66 through the back body locking member 42, the front body 14 would be free floating inside the bore 26 of the back body 12.

After the back 12 and front bodies 14 are joined into a single connector assembly 16, an optical fiber 74 is disposed through the back body 12, the front body 14, and the ferrule 74. A portion of a fiber optic cable 76 is stripped back to expose an electrical wire 78 and a strength member 82 which is typically provided as a KEVLAR wrap (KEVLAR is a trademark of E. I. DuPont deNemours & Co.). The electrical wire 78 and the strength member 82 are secured proximate the back end 24 of the back body 12 by a crimp sleeve 84. As described previously, the back body 12 is made from an electrically conductive material to provide a current path from the electrical wire 78. Alternatively, the back body 12 may incorporation a portion which is conductive, the conductive portion being aligned with the electrical wire 78 from the cable during assembly.

The optical fiber 74 and its cladding and buffer 86 pass through the back body 12 into the buffer back post 60. The optical fiber 74, stripped of the cladding and buffer 86, extends beyond the buffer back post 60 and terminates in the ferrule 72 which is fixedly disposed in the cavity 56 of the front body 14. It is desirable to allow some relative movement between the ferrule and the back body 12 for purposes of alignment and stress relief. The optical fiber 74 is typically attached to the ferrule 72 using epoxy injected by a syringe into the buffer back post 60.

The connector assembly 10 is disposed within the adapter assembly 16 for attachment to any other desired device. The adapter assembly includes an inner sleeve 88 surrounding the ferrule 72 to hold the fiber 74 in alignment with an abutting optical connection (not shown), depending on the particular device to which the fiber is to be connected. An outer sleeve 92 surrounds and extends over the end 87 of the inner sleeve 88.

A holder 94 is provided having a bore 95 therethrough. A front portion 96 of the bore is sized to surround and retain the outer sleeve 92. A back portion 98 of the bore 95 is sized to surround and retain the front end 22 of the back body 12. An inner annular collar 102 abuts against the first end 54 of the front body 14.

The holder 94 includes two recesses 95. An electrical contact 104, preferably made of a resilient strip of a conductive material, is formed with two protrusions 106 shaped to conform to the two recesses 95. The contact 104 is retained on the holder 94, with the protrusions 106 nested in the recesses, by a boot 108 which surrounds the entire connector 10 and which includes an extension 110 to surround the holder 94. An interior recess 112 within the extension 110 of the boot 108 provides a space for the contact 104. It will be appreciated that any suitable number of recesses and protrusions may be provided to retain the contact on the holder. Alternatively, the contact 104 may be retained on the holder 94 in any other suitable manner.

The boot 108 further includes a cutaway window 114 therein. The contact 104 is bent inward to contact the back body 12 at a first location 116 to provide an electrically conducting path from the back body 12. The contact 104 is further bent outward to extend through the window 114 of the boot 108.

The boot 108 is retained on the holder 94 and other equipment via an adapter housing 118. The adapter housing 118 includes an extension 120 thereon. A metal conductor 122 is mounted within the extension 120 and extends around a back end of the extension to touch the contact 104 at a second location 124. A window 126 may be provided in the adapter housing 118 to provide access to the conductor 122 for any desired connections to be made with the conductor 122. Alternatively, or in addition, the conductor may extend to the other device 118 in any suitable manner to provide a current path thereto.

In this manner, an electrically conductive path is formed from the electric wire 78 in the cable 76 through the back post 60 and the contact 104, to the conductor 122 mounted to the adapter 16. The connector 10 is compact and is of the size of a typical SC fiber optic connector. In this manner, an electrical connection may be integrated into a fiber optic cable simply and economically.

The invention is not to be limited by what has been particularly shown and described, except as indicated by the appended claims.

I claim:

1. An integral fiber optic and electrical wire connector for a fiber optic cable containing an electrical wire, comprising:

an electrically conductive connector body including a front end and a back end;

an optical fiber retaining body coupled to said connector body;

a crimp sleeve sized to fit over said back end of said connector body to retain an electrical wire between said electrically conductive connector body and said crimp sleeve;

an adapter assembly coupled to said front end of said electrically conductive connector body, said adapter assembly comprising:
      a holder member coupled to said connector body,
      an adapter housing coupled to said holder for coupling the fiber optic and electrical wire connector to a device,
      an electrical contact coupled to said holder and in electrical contact with said front end of said electrically conductive connector body, and
      a conductor coupled to said adapter housing in electrical contact with said electrical contact;

whereby an electrically conductive path is provided from said electrical wire through said electrically conductive connector body and said electrical contact to said conductor.

2. The integral fiber optic and electrical wire connector of claim 1, wherein the electrical contact comprises a resilient strip of conductive material.

3. The integral fiber optic and electrical wire connector of claim 2, wherein said resilient strip is bent to contact said electrically conductive connector body at a first location and is further bent to contact said conductor at a second location.

4. The integral fiber optic and electrical wire connector of claim 1, further comprising a boot having an inner diameter sufficient to surround said electrically conductive connector body and coupled to said holder to retain said electrical contact on an outer surface of said holder.

5. The integral fiber optic and electrical wire connector of claim 4, wherein said boot includes a window formed therein to provide access to said conductor for said electrical contact.

6. The integral fiber optic and electrical wire connector of claim 1, wherein said conductor comprises a conductive element mounted in a recess in said adapter housing.

7. The integral fiber optic and electrical wire connector of claim 6, wherein said adapter housing further includes a window formed therein to provide access to said conductor.

8. The integral fiber optic and electrical wire connector of claim 1, wherein said electrically conductive connector body includes a bore therethrough and said optical fiber retaining body is disposed within said bore.

9. The integral fiber optic and electrical wire connector of claim 1, wherein said optical fiber retaining body is biassed for relative axial movement within said electrically conductive connector body.

10. The integral fiber optic and electrical wire connector of claim 1, wherein said electrically conductive connector body further comprises an electrically conductive portion disposed for alignment with said electrical contact of said adapter assembly to provide an electrically conductive current path therebetween.

* * * * *